UNITED STATES PATENT OFFICE.

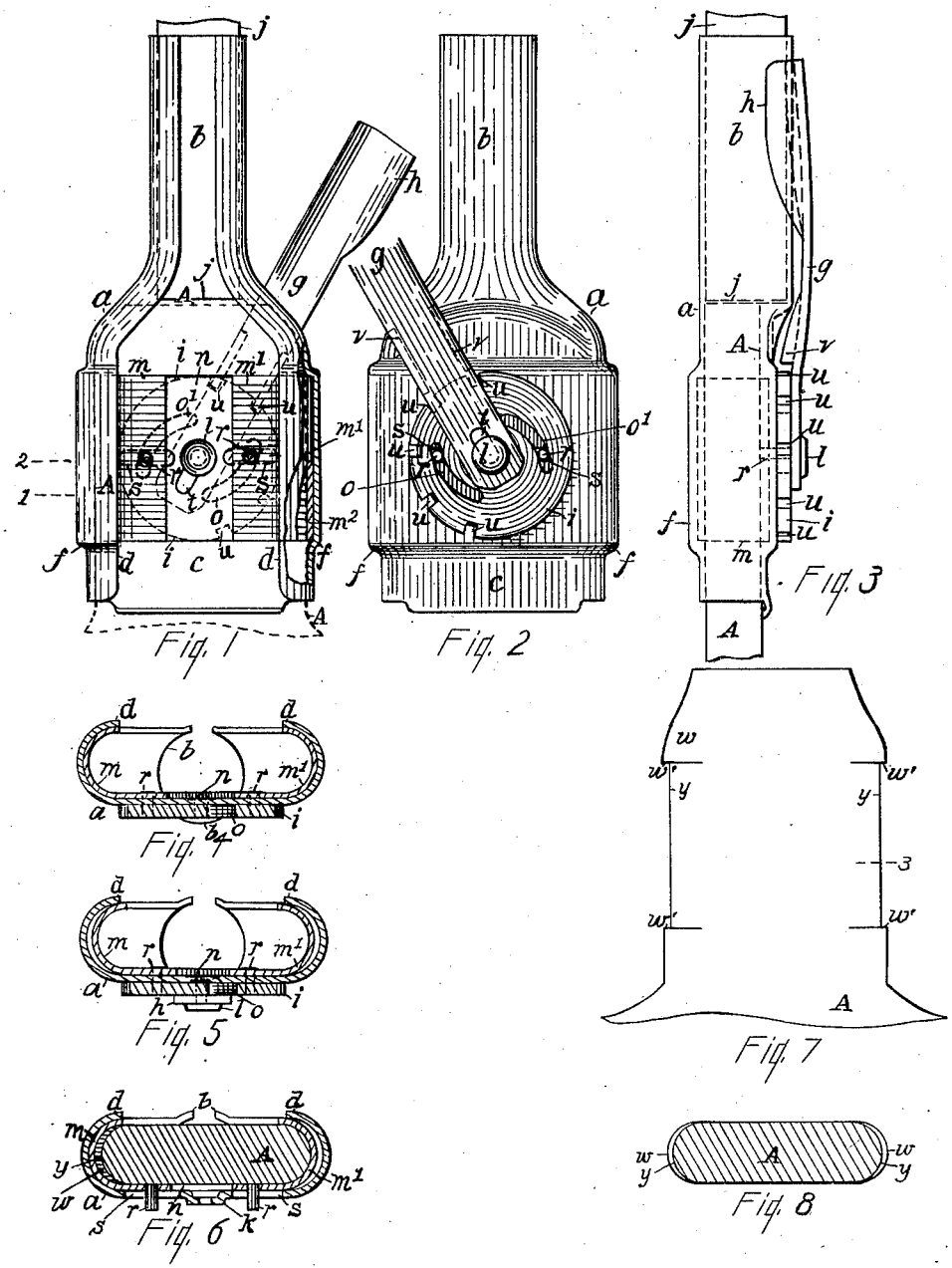

SILAS E. SELLECK, OF COLD SPRING, NEW YORK, ASSIGNOR OF ONE-THIRD TO WILLIAM H. HILL, OF COLD SPRING, NEW YORK, AND ONE-THIRD TO MARY ELLEN NOBLE, OF COLD SPRING, NEW YORK, EXECUTRIX OF ARTHUR NOBLE, DECEASED.

BAKER'S PEEL-HOLDER.

997,213.      Specification of Letters Patent.    Patented July 4, 1911.

Application filed August 18, 1910. Serial No. 577,858.

*To all whom it may concern:*

Be it known that I, SILAS E. SELLECK, a citizen of the United States, and resident of Cold Spring, in the county of Putnam and State of New York, have invented certain new and useful Improvements in Bakers' Peel-Holders, of which the following is a specification.

This invention relates to bakers' peels, and has for its object means for quickly and securely attaching a peel to a handle; which object is attained by the means set forth in this specification and the accompanying drawings, which I declare to be a clear, full, and exact description of my invention.

In the drawings like letters refer to similar parts throughout the several views.

Figure 1 is an elevation of the under side of the peel attachment. Fig. 2 is an elevation of the top side of the peel attachment. Fig. 3 is an edge elevation of the peel attachment. Fig. 4 is a transverse section of the peel holder through line 1 of Fig. 1. Fig. 5 is a transverse section through line 1 of Fig. 1, showing the movement of clamping jaws. Fig. 6 is a transverse section through line 2 of Fig. 1. Fig. 7 shows the form of the shank of the peel. Fig. 8 is a transverse section through line 3 of Fig. 7.

Referring to Figs. 1 and 2, $a$ represents a frame preferably set up of sheet metal, and comprises a round socket $b$ for the insertion of a handle $j$, and a holder $c$ for the insertion of the shank of a peel A, the peel occupying a space indicated by broken lines so as not to obscure other features of the device. The handle and peel are also indicated in Fig. 3.

To retain the peel in the holder two means are employed for securing it. A transverse recess $n$, Figs. 1, 4, 5, 6, is formed in the holder by the expansion of the holder as at $f\ f$, Figs. 1, 2, 3, and into the recess clamping jaws $m\ m'$ are fitted. As indicated in Figs. 4 and 6 the inner surfaces of the said jaws are flush with the inner surfaces of the holder when the jaws are separated to the limits of the recess, as in Fig. 4. The swell $f\ f$ due to the formation of the recess $n$, is shown as partly cut away on the right side of Fig. 1, disclosing a part of the clamping jaw $m'$, and also showing at $m^2$ a part of the clamping jaw in cross section.

These jaws constitute a clamping means for the peel. Next, the peel is made with a shank as in Figs. 7 and 8, with notches $y$ corresponding in length and depth with the clamping jaws in the holder. The head $w$ of the peel shank presents corners $w'\ w'$, which make it impossible to withdraw the peel when the clamping jaws are closed about the notches $y$, even though the said jaws should not be drawn tightly.

Upon the outside of the holder $c$ a cam disk $i$ is centrally pivoted at $l$, Figs. 1, 2, 3, 5. Cam slots $o\ o'$ are provided in the disk. Pins $r\ r$, shown particularly in Figs. 1, 2 and 6, are fast in the clamping jaws, and extend through the transverse slots $s\ s$ in the holder, and through the cam slots $o\ o'$. Turning the cam disk will cause the pins $r\ r$ to move laterally in the slots $s\ s$, producing a lateral movement of the clamping jaws $m\ m'$, in the recess $n$, Fig. 1. The clamping jaws are shown in the open position in Fig. 4, and as closed in Fig. 5. In Fig. 6 one jaw $m$ is shown open, and the other jaw $m'$ as closed upon the shank of the peel. A lever $g$ is provided for turning the cam disk $i$. The lever is provided with lugs $v\ v$, Figs. 1, 2, 3, that are adapted to engage with notches $u$ in the cam disk. The lever is held in place by the head $l$ of the rivet that also serves to retain the cam disk. The lever is slotted as at $t$, Figs. 1, 2, to admit of a lateral movement upon its pivot, so that pushing the lever toward the center causes the lugs $v$ to engage with the notches $u$ in the cam disk, as in Fig. 1, while pulling the lever from the center disengages the lugs, as in Figs. 2, 3. The lever can be made to engage with any of the notches in the cam disk for the purpose of turning the disk, and after the disk is tightened the lever is disengaged from the disk, and is carried to a position upon the socket 3, as shown in Fig. 3. The handle is curved transversely to conform to the round of the socket $b$, and is bent toward the socket so that it will have a spring toward the socket, and so remain in place as shown in Fig. 3. To keep it always upon the side of the socket where it can be most conveniently used, the end of the handle has an extended lip $h$, which will prevent its being pushed to the wrong side of the socket.

The peel is made as in Fig. 7, the shank

A having rounded edges to conform to the shape of the holder, as in Figs. 6 and 8, and is notched upon the edges as at $y$ $y$, the notches forming shoulders upon the head $w$. The peel passes easily into the holder, the cam disk is turned by means of the handle $g$ drawing the clamping jaws into the notches in the peel, and the pitch of the cam slots in the cam disk is such as to give a strong grip to the jaws, and one that cannot become loosened without help. The peel cannot be pulled from the holder without stripping the shoulders $w'$ $w'$ from the head of the peel shank.

The cam disk is omitted from Fig. 6 in order to plainly show the relations of the pins $r$ to the slots $s$, and also to show that a boss or hub $k$ is stamped in the holder, to form a bearing for the cam disk, giving to the disk a substantial support.

Only the features that combine and coact with the cam disk and its actuating lever are claimed herein, and not the said disk and lever combination.

Claims:

1. In a baker's peel, a holder for the peel, a socket for a handle forming a part of the holder, a transverse recess in the holder, clamping jaws in said recess adapted to be drawn toward each other, actuating pins in the jaws, transverse slots in the holder in which the actuating pins project and move, in combination with a notched cam disk pivoted on the side of the holder, said disk provided with cam slots to engage with the jaw actuating pins, and a lever movable on the disk pivot, the lever provided with lugs to engage with the notches in the cam disk for actuating said disk.

2. The combination of a baker's peel and a holder, the shank of the peel adapted to fit the holder, notches in the said peel shank, a transverse recess in the holder, jaws for clamping the peel shank in said recess, the notches in the shank of the peel adapted to have said jaws drawn therein, actuating pins in the jaws, and transverse slots in the holder through which the said actuating pins in said jaws project, in combination with means for actuating the jaws comprising a cam disk pivoted on the side of the peel, cam slots in the disk to engage with the jaw actuating pins, notches in the disk, and a lever movable on the pivot that secures the disk, the lever provided with lugs engageable with the notches in the disk for turning the disk.

3. A baker's peel having a shank adapted for insertion in a holder, the shank provided with notches upon its edges, forming projecting shoulders that constitute a head on the end of the shank, and adapted for having the holder close upon the notched surfaces below the said head.

Signed at Cold Spring in the county of Putnam and State of New York, this 24 day of May A. D. 1910.

SILAS E. SELLECK.

Witnesses:
JOHN SMYTHE,
WILLIAM PILSON.

---

Copies of this patent may be obtained for five cents each, by addressing the "Commissioner of Patents, Washington, D. C."